A. N. GABEL, Sr.
Fertilizers Distributing Attachment for Planters.

No. 229,394. Patented June 29, 1880.

WITNESSES
Chas. Nister
C. Sedgwick

INVENTOR:
A. N. Gabel Sr.
BY Munn &Co.
ATTORNEYS.

UNITED STATES PATENT OFFICE.

ALFRED N. GABEL, SR., OF RIDGEVILLE, ILLINOIS.

FERTILIZER-DISTRIBUTING ATTACHMENT FOR PLANTERS.

SPECIFICATION forming part of Letters Patent No. 229,394, dated June 29, 1880.

Application filed September 20, 1879.

*To all whom it may concern:*

Be it known that I, ALFRED N. GABEL, Sr., of Ridgeville, in the county of Iroquois and State of Illinois, have invented a new and Improved Fertilizer-Distributing Attachment for Planters, of which the following is a specification.

Figure 1:
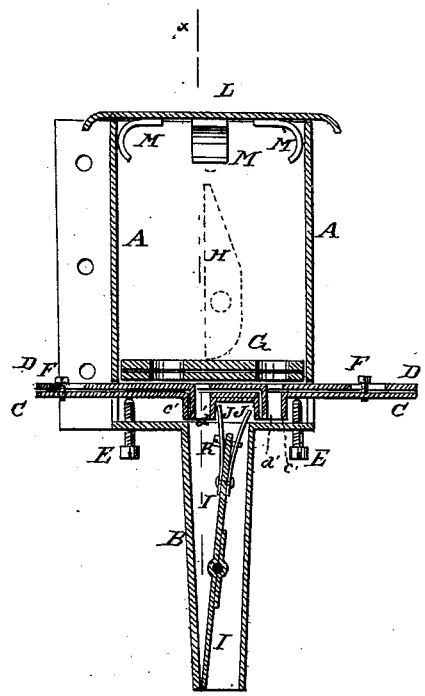
Figure 2:
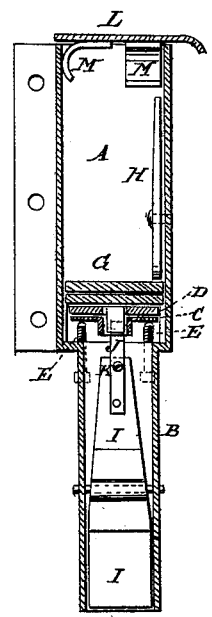
Figure 3:
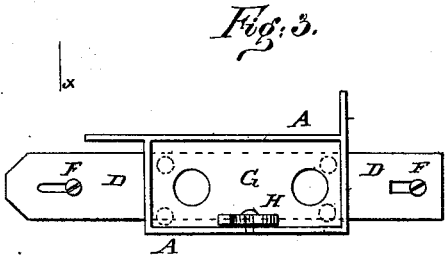
Figure 4:
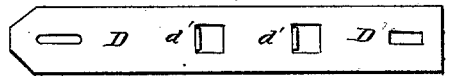
Figure 5:
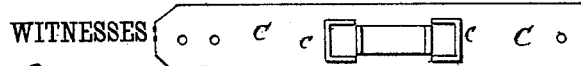

Figure 1 is a sectional side elevation of my improvement. Fig. 2 is a cross-section of the same, taken through the line *x x*, Fig. 1. Fig. 3 is a plan view of the same. Fig. 4 is a detail view of the upper dropping-plate. Fig. 5 is a detail view of the lower dropping-plate.

Similar letters of reference indicate corresponding parts.

The object of this invention is to furnish an improved attachment for planters for distributing fertilizers in hills or drills and in any desired quantity.

A represents a box, which is designed to be attached to or formed upon the seed-box of a planter. B is a spout, the upper end of which is secured in a hole in the bottom of the box A.

C D are two plates, the ends of which pass through apertures in the ends of the box A, and which rest and slide upon set-screws E, passing up through the bottom of the box A.

In the plate C are formed two apertures for the passage of the fertilizer, which apertures are surrounded with downwardly-projecting flanges *c'*, of such a depth as to contain enough fertilizer to be dropped at a time, and having their lower edges resting upon the bottom of the box A.

In the plate D are formed two apertures, corresponding in size and position with the apertures of the plate C, and provided with downwardly-projecting flanges *d'* upon one side, which flanges fit into the apertures of the plate C and form one side of the said apertures.

The plates C D are fastened together by screws F, which pass through slots in one of the said plates and enter screw-holes in the other plate, so that the amount of fertilizer dropped at a time may be regulated by adjusting the said plates upon each other.

In the box A, above the dropping-plates C D, is placed a plate, G, in the end parts of which are formed two apertures to allow the fertilizer to enter the apertures of the dropping-plates C D, the part of the said plate between its apertures serving as a cut-off to prevent any more fertilizer passing out at a time than enough to fill the said dropping-apertures. The plate G may be secured in place by a button, H, pivoted to the side of the box A.

In the conductor-spout B is placed a valve-plate, I, which is pivoted at its middle part to the said spout B. To the upper end of the valve-plate I are attached the lower ends of two elastic arms, J, the upper ends of which incline from each other and are provided with a screw, K, by which they may be drawn together more or less, as may be required. The upper ends of the arms J project into the space between the flanged apertures of the plate C, so that the valve-plate I may be vibrated by the movement of the plate C.

By turning the screw K to expand the arms J the lower end of the valve-plate I, at each vibration, will come in contact with the side of the spout B and detain the fertilizer until the next vibration drops it in a hill.

By contracting the arms J the lower end of the valve-plate I will not reach the side of the spout B, a narrow opening being left, through which the fertilizer will gradually escape, so as to be spread along the row.

The box A is provided with a cover, L, which may be secured in place by springs M or other suitable means.

Having thus described my invention, I claim as new and desire to secure by Letters Patent—

The combination, with spout, of a swinging valve provided with elastic arms and screw-adjustment, as and for the purpose specified.

ALFRED NAPOLEON GABEL, SR.

Witnesses:
JOSEPH B. FUSBY,
W. M. BARRETT.